R. E. HELLMUND.
SYSTEM OF CONTROL.
APPLICATION FILED APR. 18, 1917.
1,308,070.
Patented July 1, 1919.
4 SHEETS—SHEET 1.
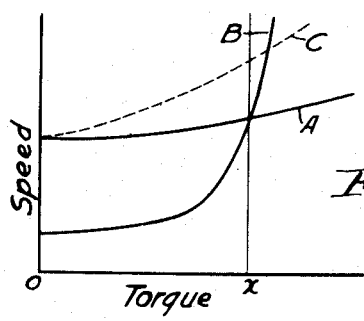
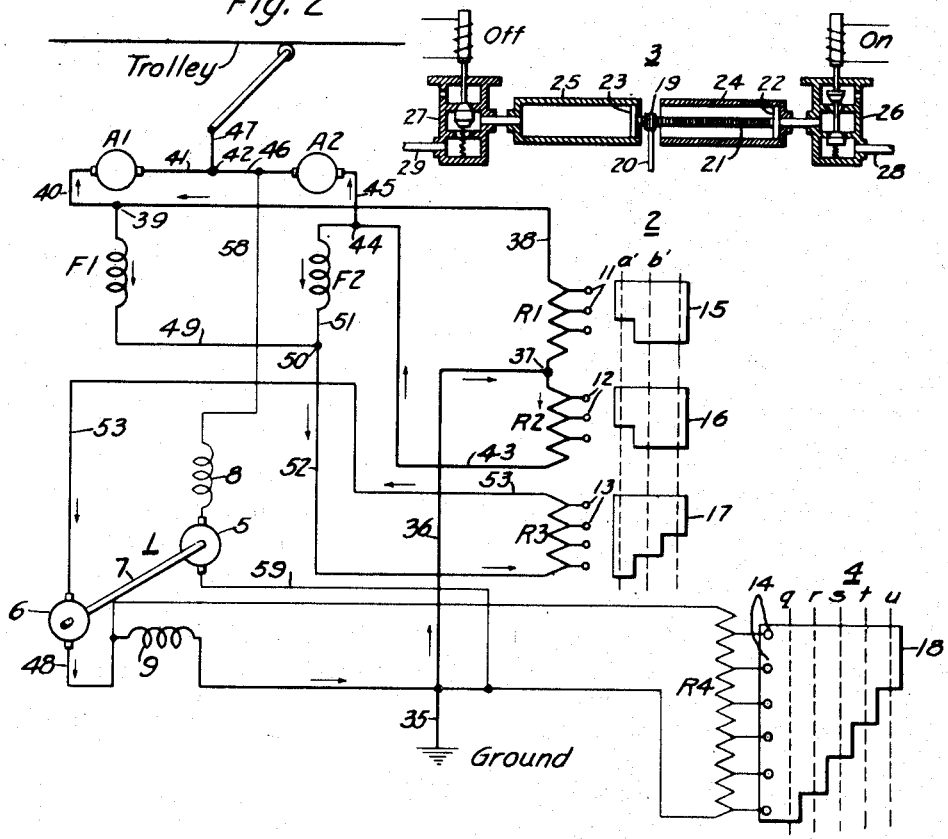
WITNESSES:
Fred C. Wilharm
W. R. Coley
INVENTOR
Rudolf E. Hellmund
BY
Wesley G. Carr
ATTORNEY

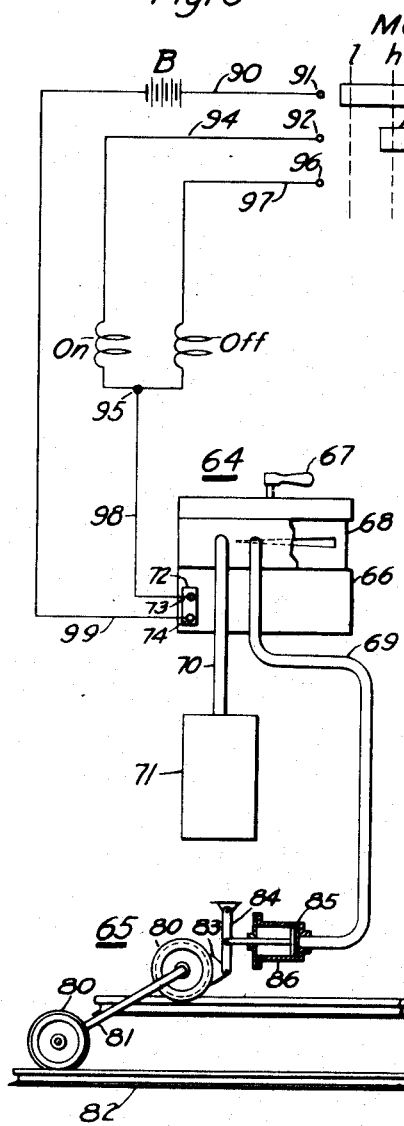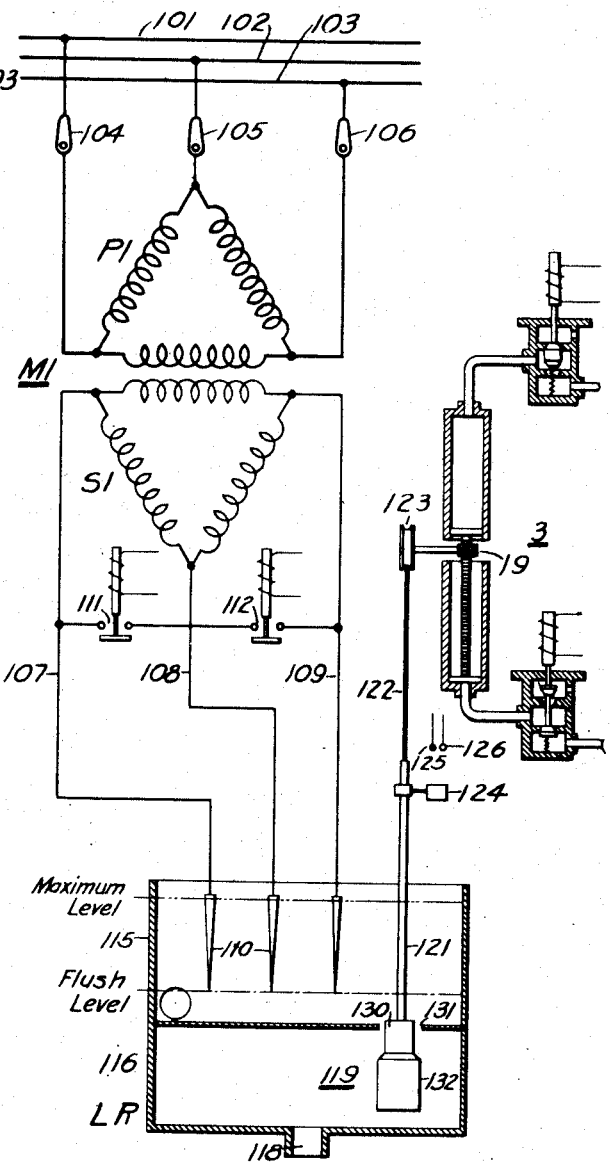

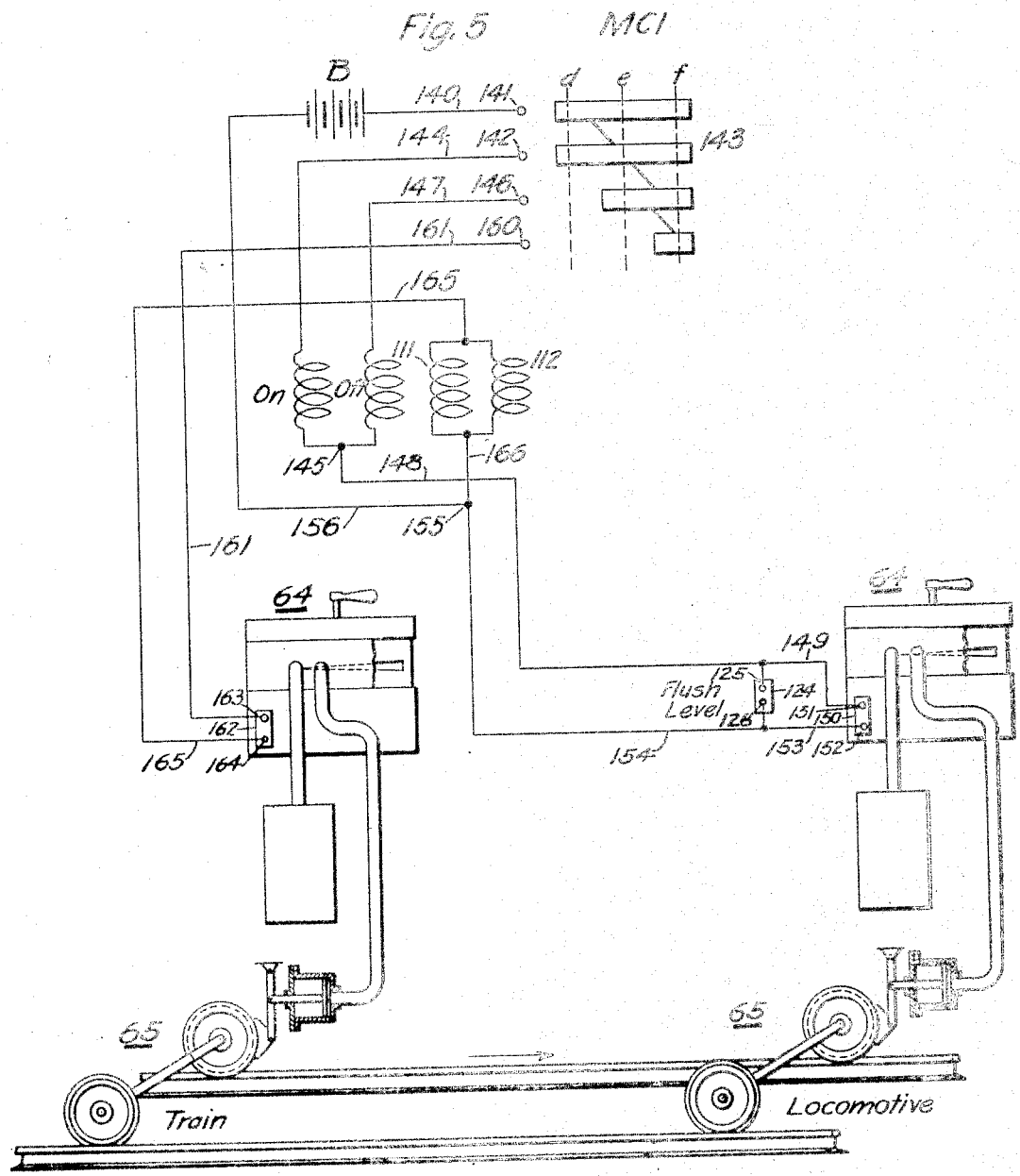

R. E. HELLMUND.
SYSTEM OF CONTROL.
APPLICATION FILED APR. 18, 1917.
1,308,070.
Patented July 1, 1919.
4 SHEETS—SHEET 4.
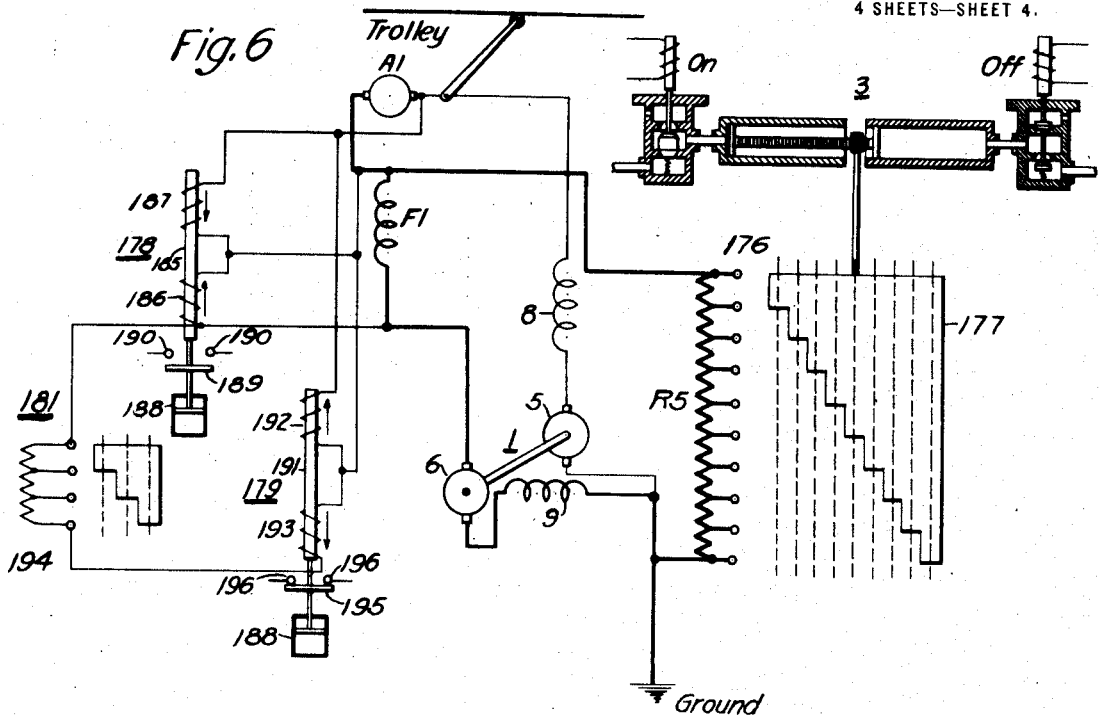
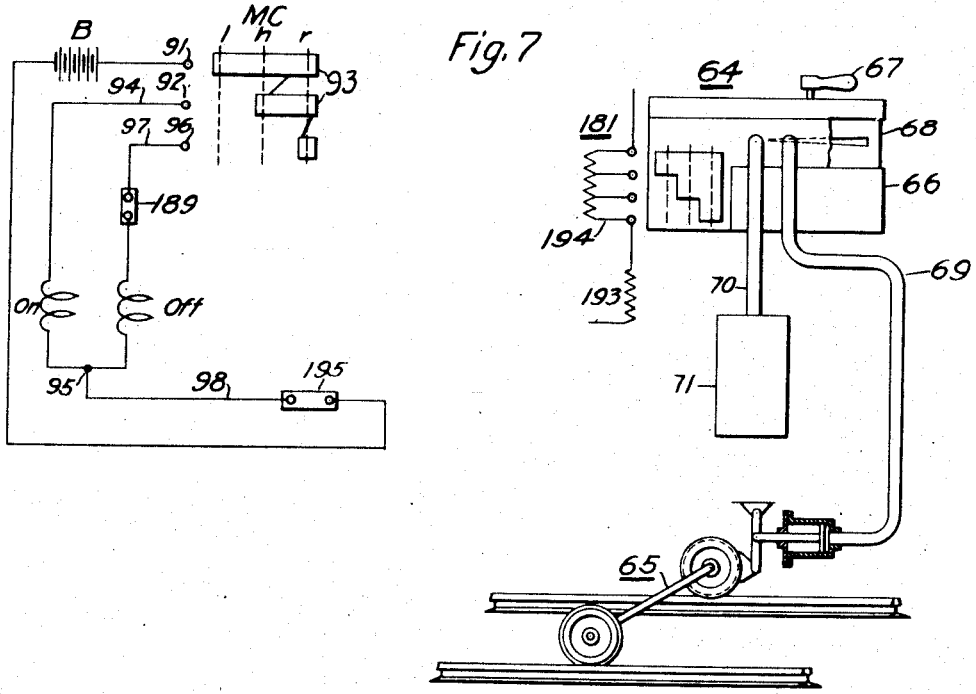
WITNESSES:
INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,308,070.  Specification of Letters Patent.  Patented July 1, 1919.

Application filed April 18, 1917. Serial No. 162,968.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to the braking or retarding of a momentum-driven vehicle by the use of both electrical and mechanical braking systems.

In many cases, it is desirable to impart a relatively "flat" speed-torque operating characteristic to a momentum-driven dynamo-electric machine during regenerative operation, or the equivalent, such characteristic being obtained with induction motors having short-circuited secondary windings or with direct-current motors having circuit connections that inherently, or by suitable control, produce a shunt or a slight compounding characteristic. When a dynamo-electric machine is running in accordance with a relatively "flat" speed-torque curve, a slight change in speed will, of course, effect a material variation of torque and armature current, and such variation may be objectionable. Consequently, if for any reason, the air-brake or other mechanical braking system is required to supplement the electric braking action, an application of mechanical brakes under the above-noted conditions would tend to produce such an objectionable variation of regenerative torque. The variation in question is particularly undesirable in case the mechanical braking system is applied upon a locomotive, as well as upon the trailing or hauled vehicles, since such locomotive application will tend to cause "slipping" of the wheels, in accordance with familiar principles.

One object of my invention is to provide relatively simple and effective means, operative upon the application of a mechanical braking system during the regenerative period, for automatically "steepening" the above-mentioned speed-torque characteristic, that is to say, to cause the momentum-driven machine to operate in accordance with a characteristic curve whereby a change of vehicle speed will not produce an undesirable variation of regenerative torque and current.

More specifically stated, it is the object of my invention to apply the above-mentioned principles to regenerative systems of both the direct-current motor type and the alternating-current induction-motor type by suitably manipulating certain circuit resistors, or by other equivalent manipulation, upon the application of the air-brakes or other mechanical braking systems, as hereinafter set forth in detail.

Other systems embodying the speed-torque characteristics in question are broadly set forth, for example, in my copending application, Serial No. 157,918, filed Mar. 28, 1917, to which reference may be had for further exposition.

My invention may best be understood by reference to the accompanying drawings, wherein Figure 1 is a curve chart illustrating the operating characteristics, with respect to speed and torque, of a momentum-driven machine governed in accordance with my present invention; Fig. 2 is a diagrammatic view of the essential main and subsidiary circuits of a direct-current system of regenerative control embodying my invention; Fig. 3 is a diagrammatic view of an auxiliary governing system for the main circuits shown in Fig. 2; Fig. 4 is a diagrammatic view, corresponding to Fig. 2, of an alternating-current regenerative system embodying the principles of the invention; Fig. 5 is a diagrammatic view, corresponding to Fig. 3, of an auxiliary governing system for the main circuits illustrated in Fig. 4; and Fig. 6 and Fig. 7 are diagrammatic views, respectively corresponding to Fig. 2 and Fig. 3, of a further modification of my invention.

Referring to Fig. 1 of the drawings, two speed-torque curves A and B, corresponding to different final speeds or other different electrical constants of a machine circuit, represent the operation of a direct-current series motor when employed for regenerative purposes, in accordance with my present invention.

Normally the operating characteristic imparted to the momentum-driven machines is represented by the relatively "flat" portion of the curve A, included, for example, between the ordinates $o$ and $x$. Under such conditions, a relatively slight change of vehicle speed caused, for example, by the application of air-brakes, when descending a steep grade, will produce a relatively great and undesirable variation of regenerative torque. To obviate this objection, the machines should be provided at the proper time with a relatively "steep" operating characteristic corresponding to the portion of the curve B lying above the curve A, whereupon the change of speed, caused by the air-brake application, effects a relatively slight variation of regenerative torque and current.

In the case of induction motors, the limiting lower speed during regeneration is the synchronous speed corresponding to the motor pole-number, etc., and, consequently, assuming that the curve "A" also represents the "flat" characteristic of an induction-motor having a short-circuited secondary winding, the desired "steep" characteristic when the air-brake is applied, may be represented by the dotted curve C.

Some of the following figures illustrate methods and means of automatically obtaining the desired relatively "steep" operating characteristic in connection with both direct-current and alternating-current regenerative systems.

In Fig. 2, the direct-current regenerative system shown comprises suitable supply-circuit conductors respectively marked "Trolley" and "Ground"; a plurality of main dynamo-electric machines having commutator-type armatures A1 and A2 and field windings F1 and F2 of the series type; a plurality of variable main-circuit or stabilizing resistors R1 and R2 that are associated with the machines in a manner to be described to effect variations of the operating characteristics thereof; an auxiliary motor-generator set 1, or the like, that is driven from the supply circuit and is connected to excite the main field winding during the regenerative period; a plurality of variable auxiliary resistors R3 and R4 that are respectively connected in circuit with the main field windings and with one circuit of the motor-generator set 1; a controller 2 for suitably varying the active circuit values of the resistors R1 to R4, inclusive; an operating mechanism 3 for the controller 2; and a multi-position controller 4 for regulating the normal regenerative operation of the system.

The motor-generator set 1 is shown as comprising a driving or motor armature 5 that may be mechanically connected with a generating or exciting armature 6 by means of a shaft 7, or otherwise; a series-related field winding 8 for the driving armature 5 and a series-related field winding 9 for the exciting armature 6. The controller 2 embodies a plurality of sets 11, 12, 13 and 14 of stationary control fingers and a corresponding number of movable contact segments 15, 16, 17 and 18 of configurations suitable for varying, as desired, the active circuit values of the respective resistors R1 to R4, inclusive.

The operating mechanism 3 is of a familiar electrically-controlled, pneumatically-actuated type and comprises a pinion 19, which is rigidly secured to the operating shaft 20 of the controller 2 and is adapted to mesh with a horizontally-movable rack member 21, the opposite ends of which constitute pistons 22 and 23 that travel within appropriate operating cylinders 24 and 25, respectively. A normally closed valve 26 is associated with the outer end of the cylinder 24, while a normally open valve 27 communicates with the outer end of the other cylinder 25. Fluid pressure from any suitable source (not shown) is supplied to the respective valve members through pipes or passages 28 and 29. The valve members 26 and 27 are provided with actuating coils marked "On" and "Off", respectively, for reversing the position of the valves.

The mechanical operation of the actuating device just described, without regard to the electrical connections effected thereby, may be set forth as follows: Since the valve 27 is normally open, the pistons 22 and 23 and, consequently, the controller 2, are biased to the illustrated positions. Upon the concurrent energization of the actuating coils On and Off, such normally unbalanced fluid-pressure conditions are reversed, that is, fluid pressure is admitted to the cylinder 24 through the valve 26 and is exhausted from the cylinder 25 through the valve 27 to effect a movement of the controller 2 toward the left, in the present instance. To arrest such movement at any time, it is merely necessary to deënergize the off coil, whereby balanced fluid-pressure conditions obtain in the two operating cylinders and a positive and reliable stoppage of the mechanism is produced.

To return the apparatus to the illustrated position, both actuating coils are concurrently deënergized, whereupon fluid-pressure conditions revert to the original unbalanced state, and the desired backward movement is effected.

The regulating controller 4 is also preferably governed by an actuating mechanism 3, for example, as shown in Fig. 6 and Fig. 7; but for the sake of simplicity and clearness, the controller is shown as hand-operated, being adapted to occupy a plurality of operative positions $q$ to $u$, inclusive. The resistor R4 is connected across the series field winding 9 for the exciting armature 6, and by actuating the controller 4 to increase the active circuit value of the resistor R4, the main field windings F1 and F2 may be suitably strengthened to compensate for the gradual decrease of the machine braking speed.

Assuming that regenerative operation has been begun in any suitable and well-known manner, which need not be described here, the main or regenerative circuit is established from the ground conductor, which is of higher potential than the trolley during regenerative operation, through conductors 35 and 36, to junction-point 37 where the circuit divides, one branch including the stabilizing resistor R1, conductor 38, junction-point 39, conductor 40, main armature A1 and conductor 41 to a junction-point 42, and the other branch including the main-circuit resistor R2, conductor 43, junction-point 44, conductor 45, the main armature A2, and conductor 46 to the junction-point 42, whence a common circuit is completed through conductor 47 to the trolley.

The main-field-winding circuits are completed from the positive terminal of the exciting armature 6 through conductor 48, the auxiliary field winding 9 and the parallel-related resistor R4, and conductor 36 to the junction-point 37, where the circuit divides, one branch traversing the resistor R1, conductor 38, junction-point 39, main field winding F1 and conductor 49 to junction-point 50, and the other branch traversing resistor R2, conductor 43, junction-point 44, main field winding F2 and conductor 51 to the junction-point 50, whence a common circuit is completed through conductor 52, resistor R3 and conductor 53 to the negative terminal of the exciting armature 6.

A further auxiliary circuit is completed from the trolley-energized conductor 46, through conductor 58, field winding 8 and armature 5 of the auxiliary driving motor and conductor 59 to the ground conductor 35.

Upon forward actuation of the controller 4, the regulating resistor R4 is gradually excluded from circuit to thereby compensate for the normal decrease of vehicle speed during the regenerative period, as previously mentioned. Furthermore, upon forward movement of the controller 2, the main-circuit resistors R1 and R2 are gradually excluded from circuit while the resistor R3 is gradually introduced into the exciting armature circuit. Thus, by a suitable design and arrangement of parts, the momentum-driven machines will operate under normal conditions, in accordance with the relatively "flat" portion of the operating characteristic curve A that is shown in Fig. 1.

On the other hand, a backward movement of the controller 2 at any given motor speed manipulates the resistors R1, R2 and R3 in the reverse directions and, therefore, tends to materially "steepen" the machine characteristic at any time, as indicated by the upper portion of the curve B that is shown in Fig. 1.

The inherent regulating action of the main-circuit or stabilizing resistors R1 and R2 may be described as follows: As indicated by the various arrows, the resistor R1 carries in the same direction both the regenerated current of the main armature A1 and also substantially one-half of the exciting current furnished by the auxiliary armature 6. A similar relation obtains between the resistor R2, the main armature A2 and the exciting armature 6.

Consequently, upon an incipient increase of regenerated current in the armature A1, for example, the voltage drop across the corresponding main-circuit resistor R1 is immediately and correspondingly increased, whereby the voltage available for delivery to the main field winding F1 from the exciting armature 6 is accordingly reduced, since the resistor R1 is included in the exciting armature circuit also. Thus, the current traversing the main field winding F1 is decreased to cause the current of the corresponding main armature A1 to subside to a normal value. The converse action takes place in case of an incipient decrease of regenerated current in either armature. Thus, what may be termed a "negative compound" characteristic is inherently imparted to the momentum-driven machines by the action of the resistors R1 and R2, irrespective of their manipulation by the controller 2. The essential circuit connections just set forth are fully described and claimed in my co-pending application, Serial No. 44,443, filed October 9, 1915, and such circuit connections are employed for illustrative purposes only, in the present instance.

Reference may now be had to Fig. 3, which illustrates an auxiliary system for automatically governing the action of the controller 2 to produce the desired modification of machine operating characteristics under conditions of an application of a mechanical braking system during the regenerative period.

The auxiliary system illustrated comprises the actuating coils On and Off for the operating mechanism 3, a master controller MC that is adapted to occupy positions $l$, $h$ and $r$ for primarily controlling the operation of the mechanism 3; a battery B or other suitable source of energy; and a mechanical braking system here shown as comprising a manually-operated engineer's valve 64 and a wheel-braking apparatus 65 of the well-known air-operated type.

The engineer's valve 64 may be of any suitable construction and is shown as embodying a member 66 that is rotatable in accordance with the manipulations of an operating handle 67 and is provided with a tapered outlet slot 68 that communicates with a brake-pipe 69 for conveying a variable fluid pressure to the wheel-braking apparatus 65. Fluid pressure is conveyed to the engineer's valve 64 through a pipe or passage 70 that communicates with a suitable tank or reservoir 71, the arrangement of parts being such that in the illustrated off or inactive position of the engineer's valve 64, no fluid pressure is admitted to the brake pipe 69, but a contact member 72, that is movable with the valve, bridges a pair of stationary contact members 73 and 74 for a purpose to be set forth.

The braking apparatus 65 may also be of any well-known type and is shown as including a plurality of vehicle wheels 80 that are mounted in the usual manner upon an axle 81 for running on rails 82, and a brake-shoe 83 for gripping the wheels 80 whenever the brake-rigging 84 is actuated through the agency of a piston 85 that travels within a brake cylinder 86, with which the brake-pipe 69 communicates.

Assuming that the master controller is actuated to its final operative position $r$, an auxiliary circuit is established from the positive terminal of the battery B through conductor 90, control fingers 91 and 92 which are bridged by contact segment 93 of the master controller, conductor 94, and the actuating coil On to junction-point 95. A second circuit is completed from contact segment 93 through control finger 96, conductor 97 and the actuating coil Off to the junction-point 95, whence a common circuit is continued through conductor 98, stationary contact members 73 and 74 which are normally bridged by movable contact segment 72 of the engineer's valve 64, and conductor 99 to the negative battery terminal.

Upon the concurrent energization of the on and off actuating coils for the operating mechanism 3, a forward movement thereof is effected, in accordance with previously described principles. To manually arrest such movement at any time, the controller may be actuated to its intermediate holding position $h$, whereby the actuating coil Off is deënergized to produce the above-mentioned balanced fluid-pressure conditions in the mechanism.

Assuming further that the master controller occupies its final operative position $r$ and that the engineer's valve 64 is manipulated to an operative position to supplement the electric braking effort by admitting fluid pressure to the brake-cylinder 86 and thereby effecting an application of the brake-shoes 83 to the wheels 80, such movement of the valve interrupts the engagement of the stationary contact members 73 and 74 with the contact segment 72 and thereby deëner-gized both actuating coils of the operating mechanism 3. Consequently, a backward movement of the controller 2 is produced in accordance with the above-mentioned operating principles, and the desired "steepening" of the speed-torque machine characteristic is automatically produced until the engineer's valve 64 is returned to its normal or inactive position, as illustrated.

It will be understood that the arrangement and manipulation of the various circuit resistors may be materially varied from the illustrated arrangement and described manipulation without departing from the spirit of my present invention.

Reference may now be had to Fig. 4, wherein the system shown comprises 3-phase supply-circuit conductors 101, 102 and 103; an induction motor M1 having a primary stator winding P1 and a secondary winding or wound rotor S1; and a liquid rheostat LR for varying the secondary-circuit resistance of the induction motor, such variation being preferably controlled by the operating mechanism 3.

The primary motor winding P1 may be connected to the supply-circuit conductors 101, 102 and 103 by means of switches 104, 105, and 106, respectively, and the terminals of the secondary winding S1 are connected through conductors 107, 108 and 109 to spaced electrodes 110 of the liquid rheostat LR. A plurality of switches 111 and 112 are also provided for short-circuiting the secondary winding S1 under conditions to be described.

The liquid rheostat LR may be of any familiar type and is shown as comprising a main tank or electrode-containing compartment 115; a bottom discharge reservoir 116; a tank inlet 117; a reservoir outlet 118, a continuous circulation of electrolyte preferably being maintained through the agency of a suitable pumping means (not shown); and a combined discharge and regulating valve 119 for fixing the height of the liquid in the electrode-containing compartment 115.

The valve member 119 is secured to an actuating rod 121 which terminates in a rope or cable 122 passing over a pulley or sheave 123 that is rotatable with the pinion 19 of the operating mechanism 3. A bridging contact member 124 is secured to the actuating rod 121 for the purpose of connecting a pair of stationary contact members 125 and 126 when the liquid in the compartment 115 reaches the plane marked "Flush-level," which corresponds to the initial immersion of the electrodes 110.

The combined discharge and regulating valve 119 comprises an upper hollow cylinder 130 of smaller diameter than the surrounding bottom opening 131 in the tank 115, whereby the electrolyte from the inlet pipe 117 is allowed to discharge into the reservoir 116 through the opening 131 when the valve occupies the illustrated or discharge position. Upon raising the valve, by means of the operating mechanism 3, to the position marked "Flush-level," a lower hollow cylindrical portion 132 of the valve substantially fills the bottom tank opening 131 and, consequently, the liquid level rises to the top of the upper valve portion 130 and discharges downwardly through the hollow valve. Subsequent raising of the valve serves to correspondingly increase the liquid level in the compartment 115.

In Fig. 5, the auxiliary governing system shown comprises the actuating coils On and Off for the operating mechanism 3, the actuating coils for the short-circuiting switches 111 and 112; a master controller MC1 that is adapted to occupy a plurality of operative positions $d$, $e$ and $f$ for primarily controlling the operation of the system; a battery B or other suitable source of energy; and a plurality of sets of mechanical braking systems, each comprising, for example, an engineer's valve 64 and a wheel-braking apparatus 65, the sets being respectively associated with a hauling locomotive and with one or more of the train of trailing vehicles that are not provided with motive power, as indicated by the corresponding legends, "Locomotive" and "Train."

Assuming that the various mechanical braking systems occupy the illustrated inoperative positions and that the master controller MC1 is actuated to its intermediate operative position $e$, one circuit is established from the positive terminal of the battery B through conductor 140, control fingers 141 and 142 which are bridged by contact segment 143 of the master controller, conductor 144 and the actuating coil On to junction-point 145. A second circuit is completed from the contact segment 143 through control finger 146, conductor 147 and the actuating coil Off to the junction-point 145, whence a common circuit is continued through conductors 148 and 149, movable contact segment 150 which is normally bridged by stationary contact members 151 and 152 of the engineer's valve 64 upon the locomotive, conductors 153 and 154, junction-point 155 and conductor 156 to the negative battery terminal.

The concurrent energization of both actuating coils for the operating mechanism 3 effects a gradual rise of the liquid level in the liquid rheostat LR to gradually reduce the secondary-circuit resistance of the induction motor. When the liquid level reaches the plane marked "Maximum-level", wherein the electrodes 110 are almost submerged, the master controller MC1 may be actuated to its final position $f$, whereby an auxiliary circuit is completed from the contact segment 143 thereof, through control finger 160, conductor 161, movable contact segment 162 which is normally bridged by stationary contact members 163 and 164 of the engineer's valve 64 for the train, conductor 165, the parallel-related actuating coils for the short-circuiting switches 111 and 112, and conductor 166 to the junction-point 155, whence circuit is completed to the negative battery terminal, as already traced.

Under such operating conditions, the induction machine M1 will regenerate in accordance with a relatively "flat" speed-torque characteristic, as indicated by the corresponding portion of the curves in Fig. 1.

However, upon the application of the air-brakes or other mechanical braking systems upon the train or trailing vehicles by the manipulation of the corresponding engineer's valve 64, the contact segment 162 becomes disengaged from the stationary contact members 163 and 164 to deënergize the actuating coils of the short-circuiting switches 111 and 112 and thus insert a predetermined value of resistance in the secondary circuit of the regenerating machine and thus tend to "steepen" the operating characteristic of the machine to a certain extent.

If the train operator desires to apply still greater mechanical braking effect, the engineer's valve 64 on the locomotive may be manipulated to admit fluid pressure to the corresponding brake-cylinder, whereupon the contact segment 150 becomes disengaged from the stationary contact members 151 and 152 to thereby deënergize both actuating coils of the operating mechanism 3 and effect a downward movement of the liquid rheostat valve 119, to gradually increase the value of the secondary-circuit resistance until the valve reaches the "flush-level" position, with the accompanying connection of the stationary contact members 125 and 126 by the movable contact member 124 of the valve-actuating rod 121. As illustrated in Fig. 5, the stationary and movable contact members just described are connected in parallel relation with the stationary and movable contact members upon the engineer's valve 64 for the locomotive and, consequently, the downward progress of the rheostat valve will be reversed or, if desired, the contact segment 124 may be actuated to energize only the actuating coil On and thus hold the liquid rheostat at "flush-level" position.

By reason of the arrangement of parts just recited, the wheel "slippage" which would probably otherwise occur upon the locomotive whenever the air-brakes were applied during the regenerative period, is effectively prevented, as will be understood.

Referring to Fig. 6, the system shown comprises the supply-circuit conductors "Trolley" and "Ground"; the main armature A1; the main field winding F1; the motor-generator set 1 and, in addition, an adjustable main-circuit resistor R5, various points of which are connected to a series of stationary control fingers 176 for successively engaging a movable contact member 177 of a control drum that is actuated by the operating mechanism 3; a plurality of relay devices 178 and 179 for maintaining the regenerating speed between predetermined limiting values; and auxiliary contact members 181 that are adapted to govern the operation of the low-current relay device 179 in a manner to be set forth.

The high-speed relay device 178 comprises a core or plunger 185 having an actuating coil 186 that is connected across the main field winding F1 and a second coil 187 that is opposingly energized from the main armature A1, as indicated by the arrows. The combined excitation of the relay device 178 is thus dependent upon the relative values of the main-armature voltage and the main-field-winding voltage, or, in other words, the relay is actuated in accordance with the variations of main-machine speed, since the main-field-winding strength is an index of the speed. A suitable dashpot 188 is preferably provided for the usual steadying purpose. The preferred type of differential relay is set forth and claimed in a co-pending application of C. C. Whittaker, Serial No. 175,595, filed June 19, 1917, and assigned to the Westinghouse Electric and Manufacturing Company.

The relay 178 is provided with a movable contact member or disk 189 which is out of contact with a pair of stationary contact members 190 in the normal or lower position of the relay, and which, in its upper position, completes certain auxiliary circuits to be described in connection with Fig. 7.

The low-speed relay device 179 is similar to that just described, having a core 191, opposing actuating coils 192 and 193 that are respectively energized directly from the main armature A1 and from the field winding F1 through an auxiliary resistor 194, which is controlled by the coöperating contact members 181; a movable contact disk 195 that bridges a pair of stationary contact members 196 in the upper or normal position of the relay to control certain auxiliary circuits, as subsequently set forth.

The arrangement of parts of the high-speed relay 178 during operation is such that the illustrated lower position is maintained until a predetermined higher machine-speed value, as indicated by a decreased voltage across the field winding F1, is reached, whereupon the core 185 is lifted through the agency of the coil 187 to close the circuit that includes coöperating contact members 189 and 190. On the other hand, the core 191 of the low-speed relay device 179 is held in its illustrated upper position until a certain lower machine speed value, as evidenced by an increased main field-winding strength, obtains, whereupon the relay is actuated to its open lower position to interrupt the corresponding auxiliary circuit. Consequently, the joint action of the two relay devices 178 and 179 serves to maintain the machine speed within predetermined limiting values.

In this way, although the circuit connections may not inherently impart a relatively "flat" speed-torque characteristic to the momentum-driven machines, the above-described use of the relay devices 178 and 179 will accomplish this result, the "flatness" of the curve being dependent upon the range between the limiting values corresponding to the respective relay devices.

Referring to Fig. 7, the only differences from the already described system of Fig. 3 reside in the insertion of the movable members 189 and 195 of the high-speed and the low-speed relay devices, respectively, in the conductors 97 and 98, and the placing of the coöperating contact members 181 upon the engineer's valve 64 for governing the circuit of the actuating coil 193 for the low-speed relay device 179.

Without tracing the circuits in detail, it will be understood that under relatively low-speed conditions corresponding to the setting of the relay device 179, the contact segment 195 interrupts its circuit, whereby the "on" coil and the "off" coil for the actuating mechanism 3 are both deënergized to cause a backward movement of the controller and thus effect a reduction of the regenerated current and of the retarding effort. On the other hand, whenever the main-armature speed increases to a certain value corresponding to the setting of the high-speed relay device 178, contact segment 189 completes the circuit of the "off" coil and, therefore, causes the main controller to advance another step, as previously described in detail, and thus effect an increase of braking effort and a reduction of speed.

When the engineer's valve 64 is manipulated to effect the application of the airbrake 65, the auxiliary resistor 194 is gradually excluded from circuit by reason of the action of the coöperating stationary and movable contact members 181, whereby the current traversing the actuating coil 193 for the low-speed relay device 179 is correspondingly reduced and, therefore, the setting of the relay device is also decreased in like degree, which signifies an increase in the range between the above-mentioned limiting values of machine speed.

The result of the operation just described is to effect a steepening of the speed-torque characteristic of the momentum-driven machine and thus prevent the previously-mentioned undesirable torque-variation conditions.

As soon as the engineer's valve 64 is returned to its illustrated normal position, the relay devices 178 and 179 again control the action of the system in the above-described manner.

I do not wish to be restricted to the specific circuit connections or arrangement of parts herein set forth, as various modifications thereof may be effected within the spirit and scope of my invention. I desire, therefore, that only such limitations shall be imposed as are indicated in the appended claims.

I claim as my invention:

1. In a system of regenerative control, the combination with a dynamo-electric machine, and means for normally operating said machine in accordance with predetermined operating conditions during the regenerative period, of a mechanical braking system, and means dependent upon the employment of said braking system for automatically modifying said operating conditions.

2. In a system of regenerative control, the combination with a dynamo-electric machine, and means for normally operating said machine in accordance with certain speed-torque relations during the regenerative period, of a mechanical braking system, and means dependent upon the application of said braking system for automatically and materially varying the normal speed-torque relations.

3. In a system of control, the combination with a dynamo-electric machine and circuit connections normally acting to impart a predetermined operating characteristic to the machine, of a mechanical braking system, and means for automatically modifying said operating characteristic whenever said braking system is employed.

4. In a system of control, the combination with a dynamo-electric machine and circuit connections normally acting to impart a relatively "flat" speed-torque characteristic to said machine, of a mechanical braking system, and means for automatically "steepening" said characteristic upon the application of said braking system.

5. In a system of control, the combination with a momentum-driven dynamo-electric machine and a translating device in circuit with certain windings of said machine, of a mechanical braking system, and means for automatically manipulating said translating device to modify the operating characteristics of the machine upon the application of said braking system.

6. In a system of control, the combination with a dynamo-electric machine and circuit connections normally acting to impart a relatively "flat" speed-torque characteristic to said machine, of a mechanical braking system, and interlocking means dependent upon the application of said braking system for automatically "steepening" said characteristic.

7. In a system of control, the combination with a momentum-driven induction motor having a primary and a secondary winding, of a variable resistor in circuit with said secondary winding, a mechanical braking system, and means for automatically increasing the active circuit value of said resistor upon the application of said braking system.

8. In a system of control, the combination with a momentum-driven induction motor having a primary and a secondary winding, of a liquid rheostat connected in circuit with said secondary winding, an operating mechanism for said rheostat having actuating coils, a mechanical braking system, and interlocking means dependent upon the application of said braking system for automatically governing said coils to operate said rheostat in its resistance-increasing direction.

9. In a system of control, the combination with a momentum-driven dynamo-electric machine and circuit connections normally acting to impart a relatively "flat" speed-torque characteristic to the machine, of a plurality of mechanical braking systems, means for automatically "steepening" said characteristic to a predetermined degree upon the application of one of said braking systems, and means for further automatically "steepening" said characteristic upon the application of a second of said braking systems.

10. In a system of control, the combination with a momentum-driven dynamo-electric machine and a translating device in circuit with certain windings of said machine, of a plurality of mechanical braking systems, means for automatically varying the active circuit value of said translating device upon the application of one of said braking systems, and means for further automatically varying said active circuit value upon the application of a second of said braking systems.

11. In a system of control, the combination with a momentum-driven dynamo-electric machine and a variable resistor in circuit with certain windings of said machine, of an operating mechanism having actuating coils for governing said resistor, means for short-circuiting said resistor, a plurality of mechanical braking systems, interlocking means dependent upon the application of one of said braking systems for automatically rendering said short-circuiting means inoperative, and interlocking means dependent upon the application of a second of said braking systems for automatically governing said actuating coils to effect an increase in the active circuit value of said resistor.

12. In a system of control, the combination with a momentum-driven induction motor having a primary and a secondary winding, of a liquid rheostat connected in circuit with said secondary winding, an operating mechanism for said rheostat having actuating coils, a plurality of switches for short-circuiting said secondary winding, a plurality of mechanical braking systems, interlocking means dependent upon the application of one of said braking systems for automatically effecting the opening of said short-circuiting switches, and interlocking means dependent upon the application of another braking system for automatically governing said actuating coils to operate said rheostat in its resistance-increasing direction.

13. In a system of control, the combination with a momentum-driven induction motor having a primary and a secondary winding, of a liquid rheostat connected in circuit with said secondary winding, an operating mechanism for said rheostat having actuating coils, a plurality of switches for short-circuiting said secondary winding, a plurality of mechanical braking systems respectively located upon the driving vehicle carrying said induction motor and upon a vehicle hauled thereby, interlocking means dependent upon the application of the hauled-vehicle braking system for automatically effecting the opening of said short-circuiting switches, and interlocking means dependent upon the application of the driving-vehicle braking system for automatically governing said actuating coils to operate said rheostat in its resistance-increasing direction.

In testimony whereof, I have hereunto subscribed my name this 30th day of March, 1917.

RUDOLF E. HELLMUND.